(12) United States Patent
Ritucci et al.

(10) Patent No.: US 6,845,991 B1
(45) Date of Patent: Jan. 25, 2005

(54) FOLDING WAGON/CART

(76) Inventors: Louis N. Ritucci, 16 Diane Dr., Woodbridge, CT (US) 06525; Joseph K. Patterson, 74 Bagburn Rd., Monroe, CT (US) 06468; Donald Barker, 8 Mountain Laurel La., Sandy Hook, CT (US) 06582

( * ) Notice: Subject to any disclaimer, the term of this patent is extended or adjusted under 35 U.S.C. 154(b) by 0 days.

(21) Appl. No.: 10/391,027

(22) Filed: Mar. 17, 2003

Related U.S. Application Data
(60) Provisional application No. 60/367,024, filed on Mar. 21, 2002.

(51) Int. Cl.$^7$ .............................. B60B 1/04; B62B 11/00; B62B 1/00
(52) U.S. Cl. ...................... 280/30; 280/415.1; 280/651; 280/47.371
(58) Field of Search ................................ 280/651, 655, 280/655.1, 656, 646, 642, 643, 644, 647, 648, 650, 658, 401, 415.1, 432, 272, 267, 30, 37, 38, 35, 32.6, 39, 40, 42, 87.01, 87.021, 87.05, 47.34, 47.35, 47.37, 43.13, 43.21, 47.38, 47.44, 33.998, 7.15, 79.2, DIG. 11; 190/18 A; 297/129, 183

(56) References Cited

U.S. PATENT DOCUMENTS

| | | | |
|---|---|---|---|
| 1,128,333 A | | 2/1915 | Krna |
| 1,158,601 A | | 11/1915 | Warlick |
| 2,549,958 A | | 4/1951 | Bosk |
| 2,563,995 A | | 8/1951 | East |
| 2,587,688 A | * | 3/1952 | Bosk ............................ 280/39 |
| 2,802,672 A | * | 8/1957 | D Angelo ..................... 280/40 |
| 3,960,252 A | * | 6/1976 | Cassimally ................ 190/18 A |
| 4,274,644 A | * | 6/1981 | Taylor ........................... 280/39 |
| 4,398,736 A | | 8/1983 | De Wijn |
| 4,522,425 A | | 6/1985 | Cornwall et al. |
| 4,637,626 A | * | 1/1987 | Foss et al. ................... 280/655 |
| 4,647,056 A | | 3/1987 | Baker |
| 4,659,096 A | * | 4/1987 | Leimgruber ................. 280/39 |
| 4,796,909 A | * | 1/1989 | Kirkendall ................... 280/651 |
| 4,993,726 A | * | 2/1991 | Schumacher et al. ......... 280/38 |
| 5,072,958 A | * | 12/1991 | Young .......................... 280/40 |
| 5,340,134 A | | 8/1994 | Dodson |
| 5,611,552 A | * | 3/1997 | Miles et al. ................ 280/32.6 |
| 5,887,879 A | * | 3/1999 | Chumley ...................... 280/40 |
| 5,957,482 A | * | 9/1999 | Shorter ........................ 280/639 |
| 6,059,298 A | * | 5/2000 | Tucker ....................... 280/32.6 |
| 6,079,777 A | * | 6/2000 | Simmons et al. ......... 297/217.1 |
| 6,607,207 B2 | * | 8/2003 | Shapiro et al. ............. 280/287 |
| 6,733,026 B1 | * | 5/2004 | Robberson et al. ....... 280/415.1 |
| 6,746,039 B2 | * | 6/2004 | Perelli et al. ............... 280/651 |
| 2004/0000458 A1 | * | 1/2004 | Weiss et al. .............. 190/18 A |

* cited by examiner

Primary Examiner—Christopher P. Ellis
Assistant Examiner—Gerald B. Klebe
(74) Attorney, Agent, or Firm—Melvin I. Stoltz (57) ABSTRACT

By providing a plurality of cooperating, foldable panel members in combination with a plurality of foldable wheel assemblies, a unique wagon or cart construction is attained which is capable of being folded into a small, compact area, whenever desired, and then quickly and easily deployed into a fully erected and operational position, which enables virtually any desired object to be easily transported. In addition, in the preferred construction of this invention, an automatically deployed structural supporting member is incorporated into the wagon/cart for providing inherent strength and rigidity to the wagon/cart when fully erected. In this way, heavy objects previously incapable of being transported are capable of being accommodated with ease.

16 Claims, 11 Drawing Sheets

FOLDING WAGON/CART

RELATED APPLICATIONS

This application is related to U.S. Provisional Patent Application Ser. No. 60/367,024, Mar. 21, 2002 entitled FOLDING WAGON/CART.

TECHNICAL FIELD

This invention relates to wagons or carts and, more particularly, to foldable wagons or carts.

BACKGROUND ART

For many years, small wagons or carts have been extremely popular and widely used by individuals of all ages. Due to the ability of these small wagons or carts, typically mounted on four wheels, to be able to transport a variety of objects with ease and convenience, many individuals have found the small wagons or carts to be extremely convenient and highly useful. Unfortunately, one drawback that exists with prior art products, which has continuously bothered users and has detracted from increased sales and broader use, is the inability of most wagons or carts to be capable of being stored in a small, compact space.

Although prior art attempts have been made to produce portable carts or wagons which are capable of being either partially or fully folded, the prior art attempts have failed to satisfy all of the consumer demands. In particular, due to the typical consumer needs for transporting a wide variety of objects, some of which are heavy, the prior art products have produced inferior wagon constructions which are incapable of supporting and transporting such heavier objects, while also being completely foldable.

In addition, prior art wagons or carts have been found to be incapable of being fully and completely folded into a small, compact area as is desired by consumers. Instead, these prior art products are only partially foldable, requiring a substantial storage area for the wagon or cart when in its folded configuration. Furthermore, other prior art carts are constructed in a manner which requires substantial effort in disassembling the wagons or carts in its entirety in order to enable the wagon/cart to be stored in a limited area. As a result, these prior art carts have failed to satisfy consumers needs and desires.

Therefore, it is a principal object of the present invention to provide a wagon or cart which is capable of being employed to transport heavy objects easily and conveniently.

Another object of the present invention is to provide a wagon or cart having the characteristic features described above which is also capable of being quickly and easily folded into a small, compact area.

A further object in the present invention is to provide a wagon or cart having the characteristic features described above which is capable of being completely folded in its entirety, without requiring any removal or component part disassembly.

Another object of the present invention is to provide a wagon or cart having the characterisitic features described above which incorporates an integrally formed and automatically deployed support member which imparts added rigidity and strength to the wagon/cart when in its fully erected and operational position.

Other and more specific objects will in part be obvious and will in part appear hereinafter.

SUMMARY OF THE INVENTION

By employing the present invention, all of the difficulties and drawbacks found in the prior art have been overcome, and a completely foldable, highly portable, easily assembled wagon/cart is realized which is capable of supporting and transporting heavy objects. Using the unique construction achieved by the present invention, compact folding of the wagon/cart is provided, with all of the components thereof incorporated therein. Furthermore, the fully assembled wagon/cart incorporates elongated support rods extending the entire length thereof, and enabling the assembled wagon/cart to easily, comfortably, and conveniently transport virtually any desired object, regardless of its weight.

In addition, due to the unique construction of the foldable, portable, wagon/cart of the present invention, the wagon/cart is folded into a small, compact configuration, which is capable of being easily carried by any individual, with all of the components required for the fully assembled wagon being integrally interconnected in the stored configuration. Consequently, all components required for the fully assembled wagon/cart are contained in the folded, compact configuration, thereby assuring that a completely usable wagon/cart is attainable whenever desired by the user.

In addition to achieving a wagon/cart which is quickly and easily changed from a completely folded, compact configuration into a fully erected and operational position, the wagon/cart of the present invention also incorporates an internal structural support member which is automatically deployed during the unfolding process. By incorporating this internal structural support member, the support surface of the wagon/cart incorporates an elongated weight bearing structural member capable of enabling heavy objects to be placed on the wagon/cart without incurring any breakage or difficulties.

In the preferred construction, the internal structural support member comprises a telescopic, interlocking tube assembly which is automatically deployed during the movement of the rear wheel assemblies from their folded positioned to their operational position. By employing this structural support member, the elongated tube components form a support beam which cooperates with the principal support surface of the fully erected wagon/cart for providing the desired strength and structural rigidity thereto. In order to further enhance the structural supporting capabilities of the tube numbers, the support surfaces incorporate concave receiving zones formed for peripherally surrounding and engaging the telescopic tube members, thereby further enhancing the structural support and inherent strength thereof.

Although a plurality of telescopic tube numbers is preferred for the structural support member of the present invention, a wide variety of other structural supporting elements can be employed without departing from the scope of this invention. One such structural support member is an elongated flexible cable or shaft which is automatically extended during the deployment of the rear wheels. This variation, as well as other variations, can be employed without departing from the scope of this invention.

Another feature incorporated into the wagon/cart of the present invention are side panels, which are completely foldable while being retained as integral components of the wagon/cart assembly. In many prior art constructions, sidewalls or panels are completely removable for purposes of storage. As a result, the sidewalls or panels are often lost or misplaced. However, in the present invention, the side panels are constructed for cooperative, overlying interengagement with each other, as well as with folded compact engagement with the support surface of the wagon/cart. As result, the wagon/cart of the present invention attains a construction which produces a fully deployable, wagon/cart having all desirable features sought by consumers, while also being completely foldable from a fully erected and operational configuration into a compact, easily storable position.

The present invention accordingly comprises an article of manufacture possessing the features, properties, and the relation of the elements which will be exemplified in the article hereinafter described, and the scope of the invention will be indicated in the claims.

THE DRAWINGS

For a fuller understanding of the nature and objects of the present invention, reference should be had to the following detailed description, taken in connection with the accompanying drawings, in which.

DETAILED DESCRIPTION

By referring to FIGS. 1–17, along with the following detailed disclosure, the preferred construction and operation of folding wagon/cart 20 of the present invention can best be understood. Although the following the following disclosure details the preferred embodiment of the present invention, variations can be made without departing from the scope of this invention. Consequently, it is to be understood that the following disclosure is intended as exemplary, and is not intended as a limitation of the present invention.

Figure 1:
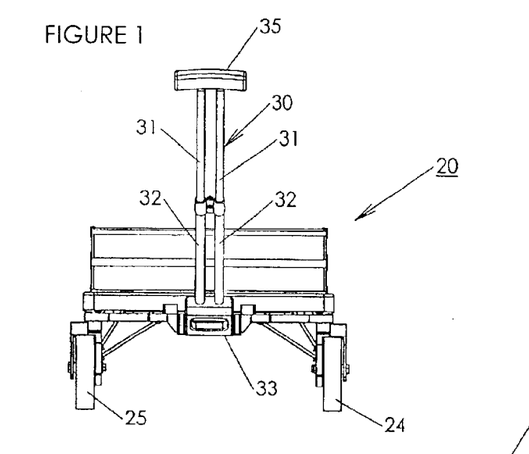
FIG. 1 is a front elevation view of the fully assembled wagon/cart of the present invention.
Figure 2:
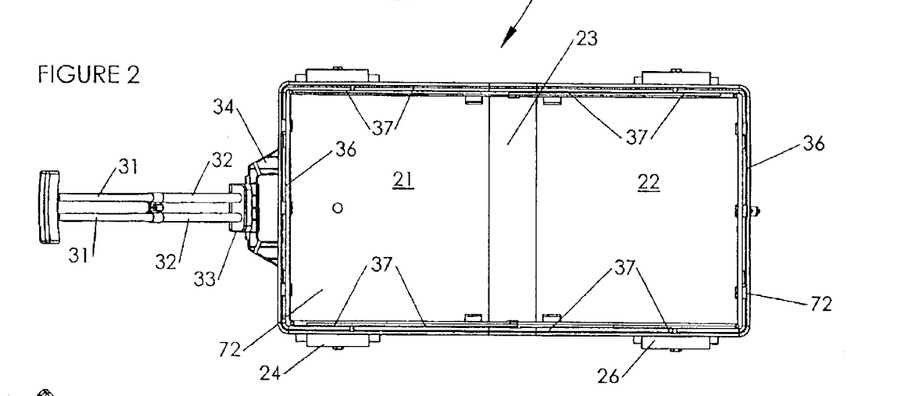
FIG. 2 is a top plan view of the fully assembled wagon/cart of FIG. 1.
Figure 3:
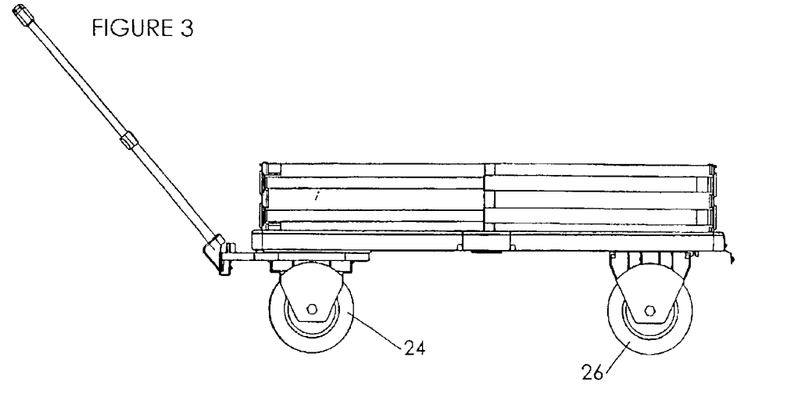
FIG. 3 is a side elevation view of the fully assembled wagon/cart of FIG. 1.
Figure 4:
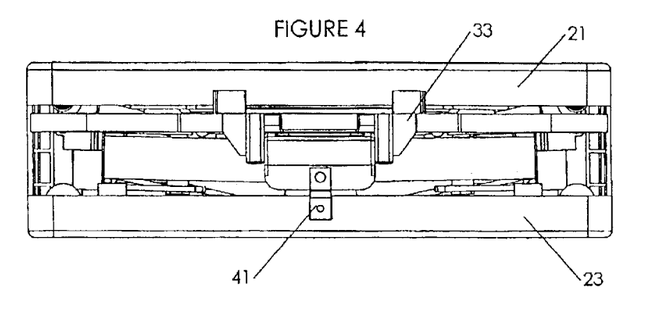
FIG. 4 is a front elevational view of the wagon/cart of the present invention depicted in its completely folded configuration.
Figure 5:
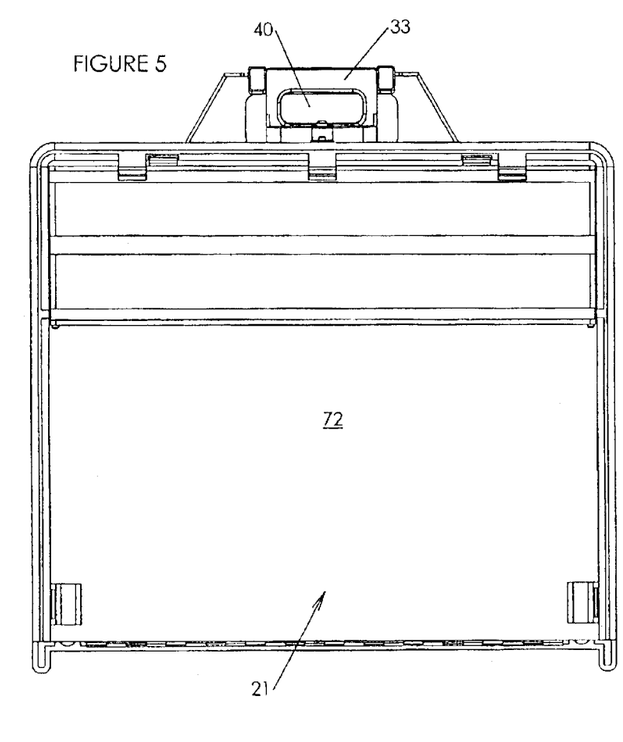
FIG. 5 is a front elevation view of the folded wagon/cart of FIG. 4.
Figure 6:
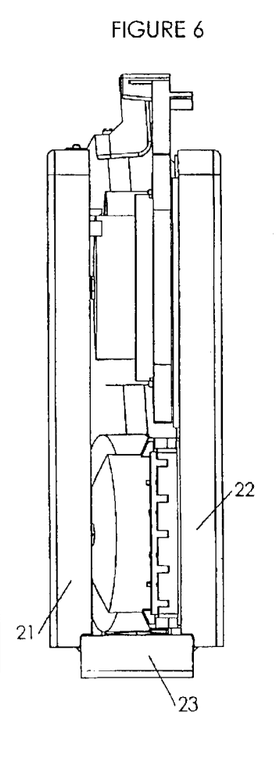
FIG. 6 is a side elevation view of the folded wagon/cart of FIG. 5.
Figure 7:
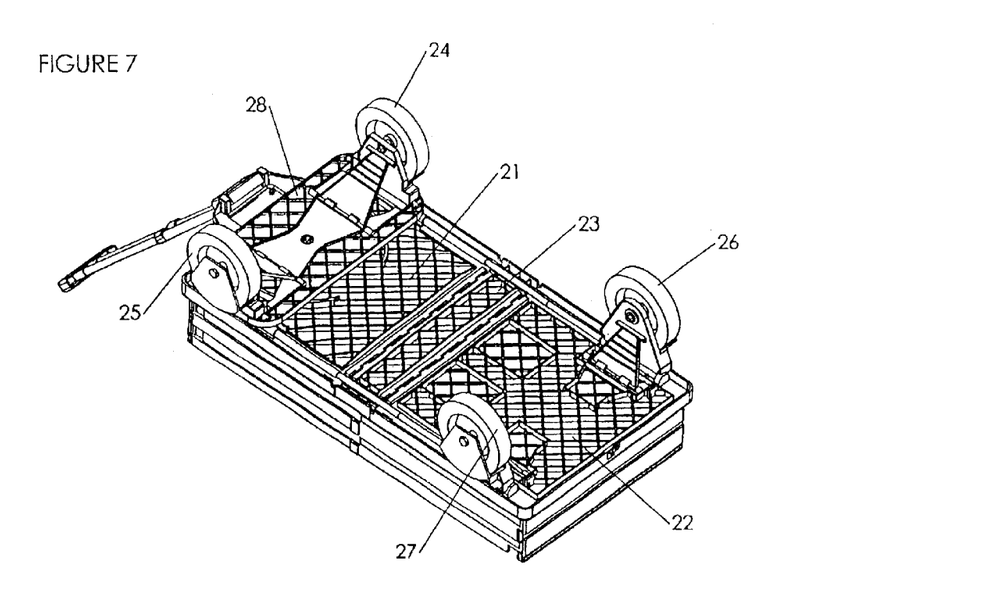
FIG. 7 is a bottom perspective view of the wagon/cart of the present invention shown completely unfolded and fully assembled.
Figure 8:
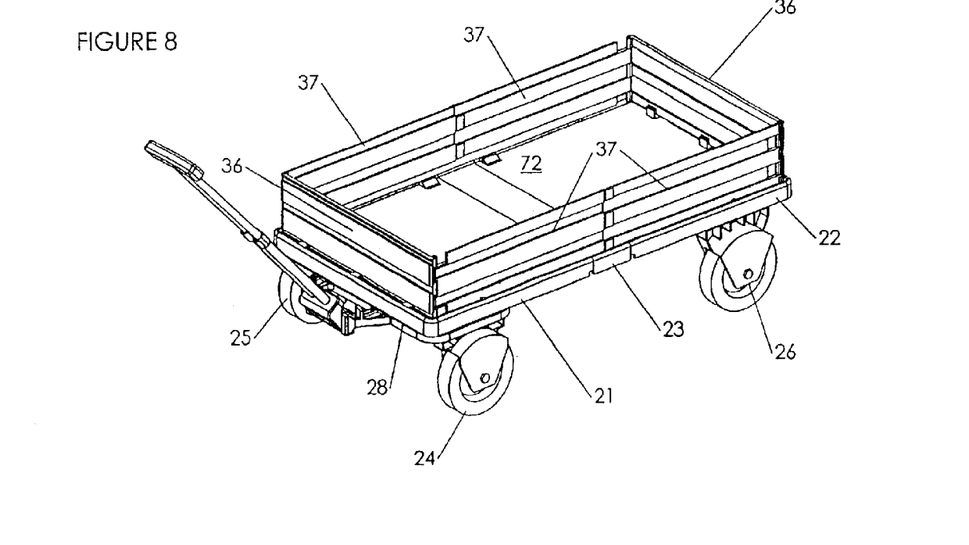
FIG. 8 is a top perspective view of the wagon/cart of the present invention shown completely unfolded and fully assembled.

In FIGS. 1–3, 7, and 8, wagon/cart 20 is depicted in its fully assembled configuration, ready for use. In contrast therewith, wagon/cart 20 is depicted in FIGS. 4–6 in its completely folded, compact configuration. As detailed herein, in both of these contrasting configurations, wagon/cart 20 incorporates all of the identical components and elements.

In this regard, wagon/cart 20 incorporates front support panel 21, rear support panel 22, and intermediate, interconnecting support panel 23. Support panels 21, 22, and 23 form the base of wagon 20, upon which any desired object is placed for being transported by the user. In order to enable the movement of wagon/cart 20 and the transportation of any desired object placed on support panels 21, 22, and 23, wagon/cart 20 also incorporates wheel assemblies 24, 25, 26, and 27.

In addition, in order to assure ease of use and maneuverability of wagon/cart 20, pivot plate 28 is mounted to the front end of wagon/cart 20 with wheel assemblies 24 and 25 affixed thereto. Furthermore, pivot plate 28 is secured to panel 21 in a manner which enables plate 28 to be arcuately pivoted relative to support panel 24. In this way, as is more fully detailed below, wagon/cart 20 of the present invention is capable of being turned, moved, and articulated in a wide variety of alternate positions and orientations.

In order to enable wagon/cart 20 to be easily controlled by the user and moved into any desired position or location, wagon/cart 20 incorporates movement control arm 30. In the preferred embodiment, control arm 30 comprises a pair of elongated, telescoping tube members 31 and 32 which are constructed for being quickly and easily moved between a collapsed configuration, wherein tube members 31 are engaged within tube members 32, and an extended position, wherein tube members 31 are telescopically removed and extend from tube members 32.

In addition, tube members 32 are mounted to bracket 33 which is pivotally secured to bracket 34 of pivot plate 28. In this way, arm member 30 is capable of being easily pivoted relative to panel 21 whenever desired by the user. Finally, in order to provide further ease of use, handle of 35 is mounted to the terminating ends of tube members 31.

Another feature incorporated into wagon/cart 20 of the present invention is the incorporation of front and rear wall members 36 and a plurality of side wall segments 37. When fully deployed, wall members 36 and cooperating wall segments 37 peripherally surround support panels 21, 22, and 23. Although numerous alternate constructions can be implemented, the preferred embodiment employs panels 36 which are mounted at the front and rear edges of wagon/cart 20, with panel segments 37 being interconnected to each other in pairs, and foldable relative to each other hand and to panels 36. In this way, rapid deployment and compact storage is achieved.

Figure 9:
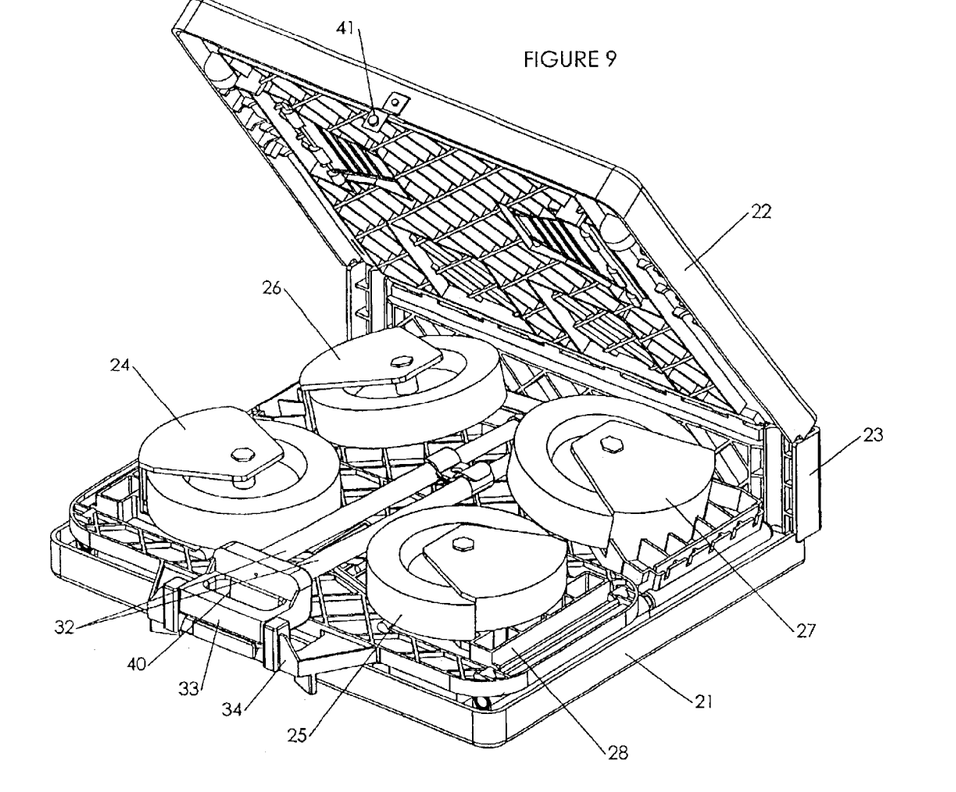
FIG. 9 is a perspective view of the wagon/cart of the present invention in the process of being initially unfolded.

In FIG. 9, wagon/cart 20 is depicted in its folded configuration while in the process of the being opened. As shown therein, the unfolding and erection process of wagon/cart 20 commences by arcuately pivoting support panel 22 relative to support panel 21.

As is evident from a review of FIG. 9, wheel assemblies 24, 25, 26, and 27, are in a fully collapsed, folded configuration, when in the stowed position, in order to assure that a minimum of space is being occupied by these components. Furthermore, as clearly shown in FIG. 9, wheel assemblies 26 and 27 are positioned directly adjacent wheel assemblies 24 and 25, when in the stowed position, in order to provide the required compact arrangement. In addition, arm member 30 is in its collapsed position, with tube members 31 telescopically inserted into tube members 32, thereby enabling arm member 30 to be easily positioned between the folded wheel assemblies.

In the preferred embodiment, as best seen in FIG.S 4, 5, and 9, bracket 33 of arm member 30 incorporates an enlarged open zone or cavity 40. By incorporating cavity 40 in bracket 33, a carrying handle is effectively formed for use when wagon/cart 20 is in its folded configuration. In this way, the handling and transportation of folded wagon/cart 20 of the present invention is enhanced and easily achieved.

Furthermore, in order to provide secure locked engagement of support panels 21 and 22, when the panels are in their folded configuration, strap means 41 is preferably employed, with one end thereof securely affixed to support panel 22, while the opposed end is removably engageable to a cooperating latching member formed on bracket 33. In this way, panels 21 and 22 are securely locked to each other, when in the folded configuration, as well as easily unlocked for rapid assembly.

Figure 10:
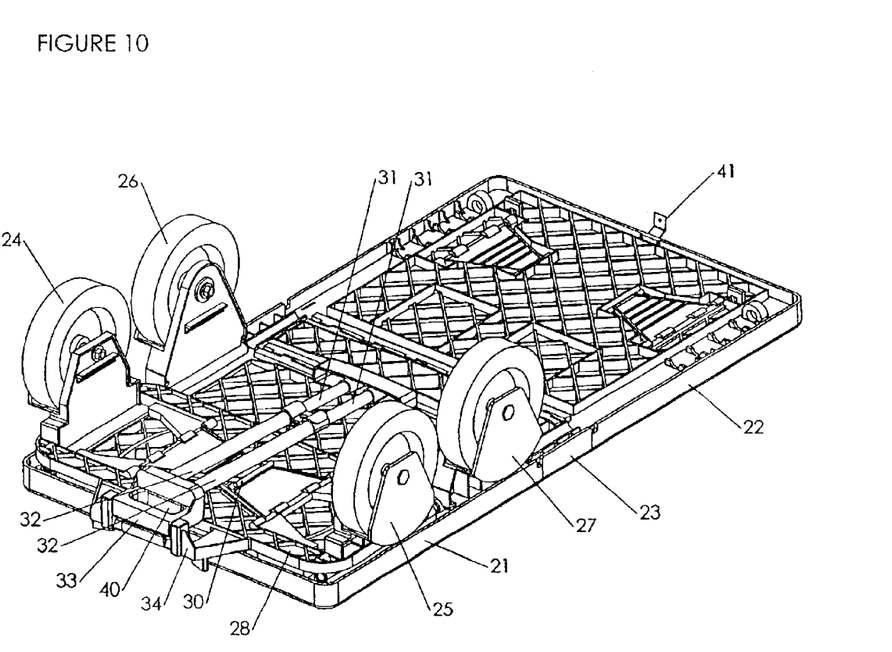
FIG. 10 is a bottom perspective view of the wagon/cart of the present invention in the process of being assembled from its folded configuration to its fully erect configuration.
Figures 11, 12:
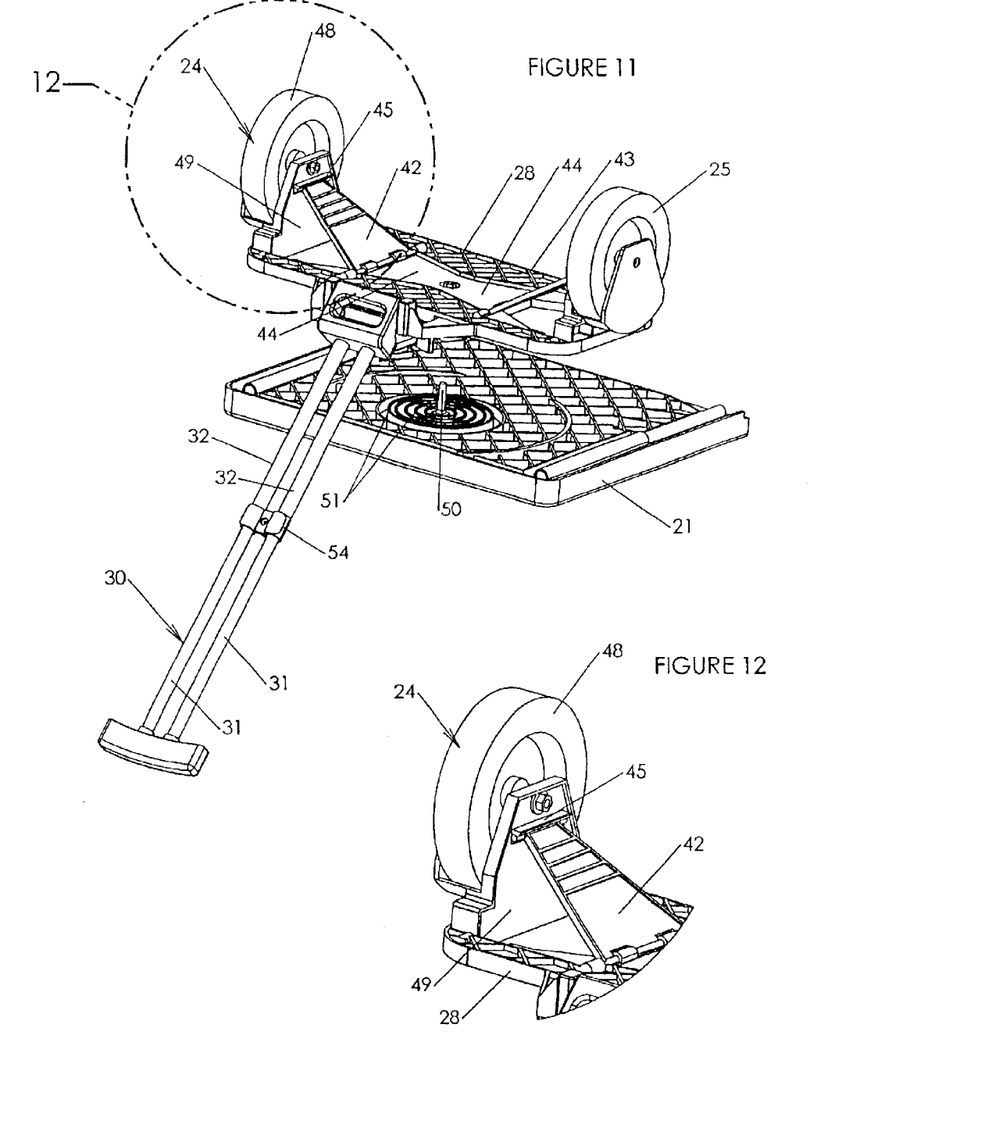
FIG. 11 is an exploded bottom perspective view, partially broken away, of the front end of the wagon/cart of the present invention.
FIG. 12 is a greatly enlarged view of a wheel assembly of the wagon/cart of the present invention designated as portion 12 of FIG. 11.

Once support panels 22 and 23 have been arcuately pivoted relative to support panel 21, in order to form a substantially continuous, horizontal elongated surface, wheel assemblies 24, 25, 26, and 27 are each arcuately pivoted about 90°, raising each wheel assembly from its folded position to its operational position, as shown in FIG. 10. In the next step, as shown in FIG. 11, locking plate 42 is arcuately pivoted from its stowed position, in holding zone 44 of pivot plate 28, to its engaged position securely abutting locking rib 45 of wheel assembly 24. Once in this position, wheel assembly 24 is ready for use.

As best seen in FIG. 12, wheel assembly 24 incorporates a wheel member 48 which is rotationally mounted to support plate 49. In the preferred embodiment, support plate 49 is affixed to pivot plate 28 along a side edge thereof, in a manner which enables support plate 49 to be arcuately pivoted relative to plate 28.

In addition, as discussed above, support plate 49 incorporates locking rib 45, formed on the inside surface thereof, and positioned for cooperating with locking plate 42 of pivot plate 28. In order to securely maintain wheel assembly 24 in its raised, operational position, locking plate 42 is arcuately pivoted into secure, abutting engagement with locking rib 45 of support plate 49, thereby securely affixing support plate 49 in its erect position, substantially perpendicular to pivot plate 28. Once in this secured position, wheel assembly 24 is fully deployed, ready for use.

Wheel assembly 25 is constructed in a substantially identical manner to wheel assembly 24, with locking plate 43 being arcuately pivoted into engagement with locking rib 45 of wheel assembly 25. Once so engaged, wheel assembly 25 is secured in its operational position. In addition, locking plate 43 cooperates with holding zone 44 formed in pivot plate 28, which is constructed for receiving and retaining locking plate 43 when in its disengaged position, enabling locking plate 43 to be stowable substantially continuous with the surface of pivot plate 28. In this way, a minimum of space is required to assure optimum, compact folding of wagon/cart 20 whenever desired.

As discussed above, pivot plate 28 is affixed to support panel 21 in a manner which assures arcuate pivoting movement of plate 28 relative to support panel 21. In the preferred embodiment, as depicted in FIG. 11, pivot plate 28 is mounted to upstanding post 50 formed on support panel 21, which defines the pivoting axis about which plate 28 is capable of arcuate, pivoting movement. Furthermore, a plurality of upstanding, arcuate or circular shape ribs 51 are formed on support panel 21 in cooperating relationship with pivot post 50.

Figure 13:
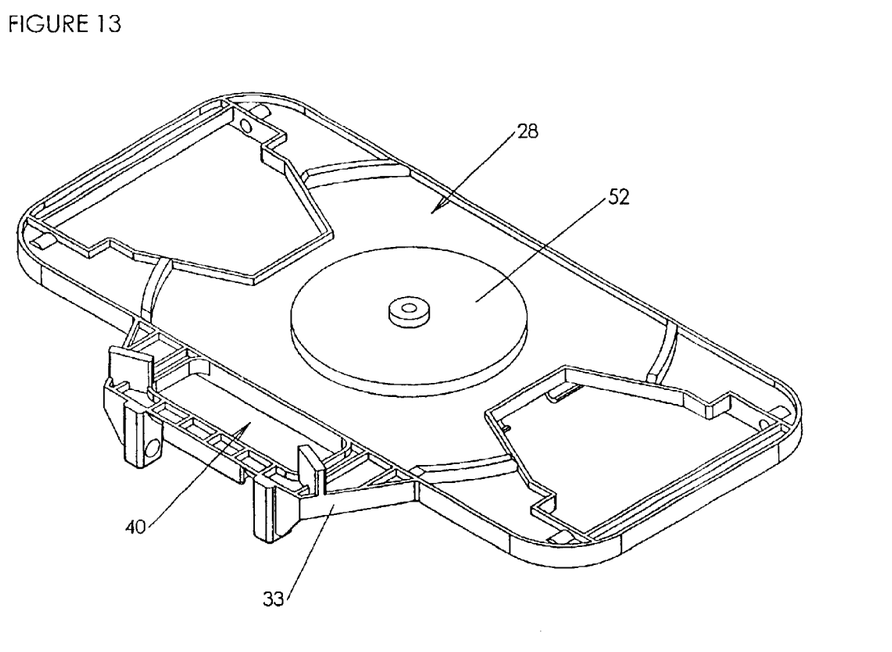
FIG. 13 is a top perspective view of the pivot plate forming a component of the wagon/cart of the present invention.

As shown in FIG. 13, pivot plate 28 comprises an enlarged, substantially circularly-shaped, flat, raised zone 52 formed on the top surface thereof. Raised zone 52 is constructed for cooperating with ribs 51 of support panel 21, in order to provide smooth, easy, sliding engagement of pivot plate 28 relative to support panel 21. In this way, the movement of pivot plate 28 relative to support panel 21 is enhanced and ease of use and operation is provided.

Typically, the next step in opening folded wagon/cart 20 of the present invention is to arcuately pivot arm member 30 from its folded position, as depicted in FIG. 10, to its operating position, as shown in FIG. 11. In addition to arcuately pivoting arm member 30 relative to bracket 34 of pivot plate 28, tube members 31 are telescopically removed from tube members 32, to their fully extended position. Although this telescopic movement can be achieved in a wide variety of alternate constructions, clamping means 54 is preferably employed for controlling the telescopic movement of tube members 31 and 32.

Figure 14:
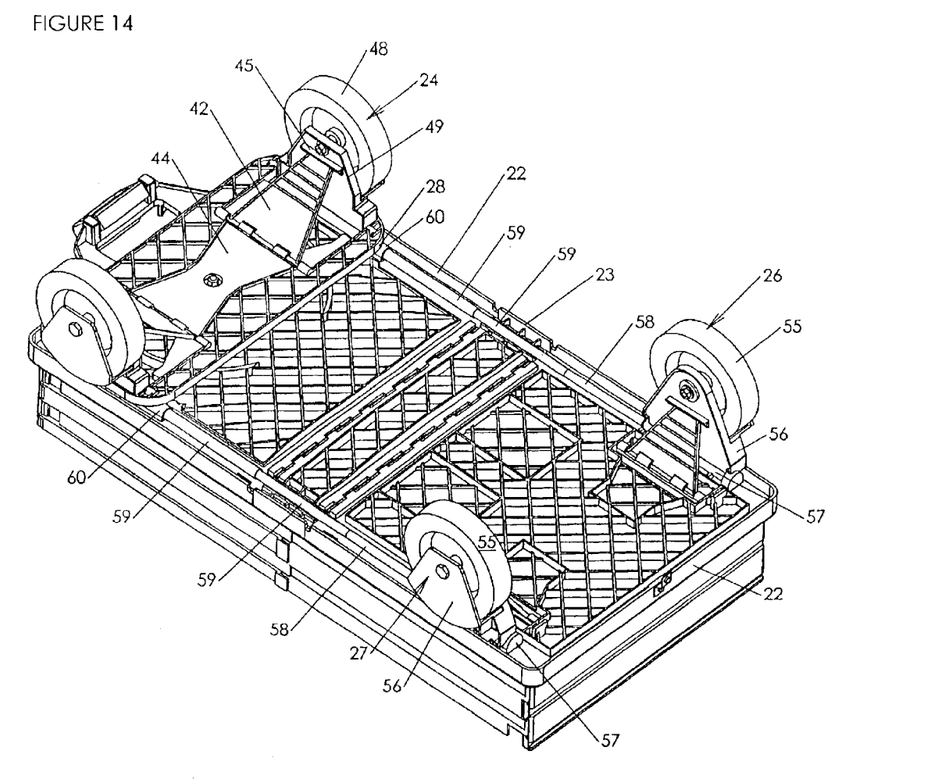
FIG. 14 is a bottom perspective view of the fully assembled wagon; cart of the present invention.
Figure 15:
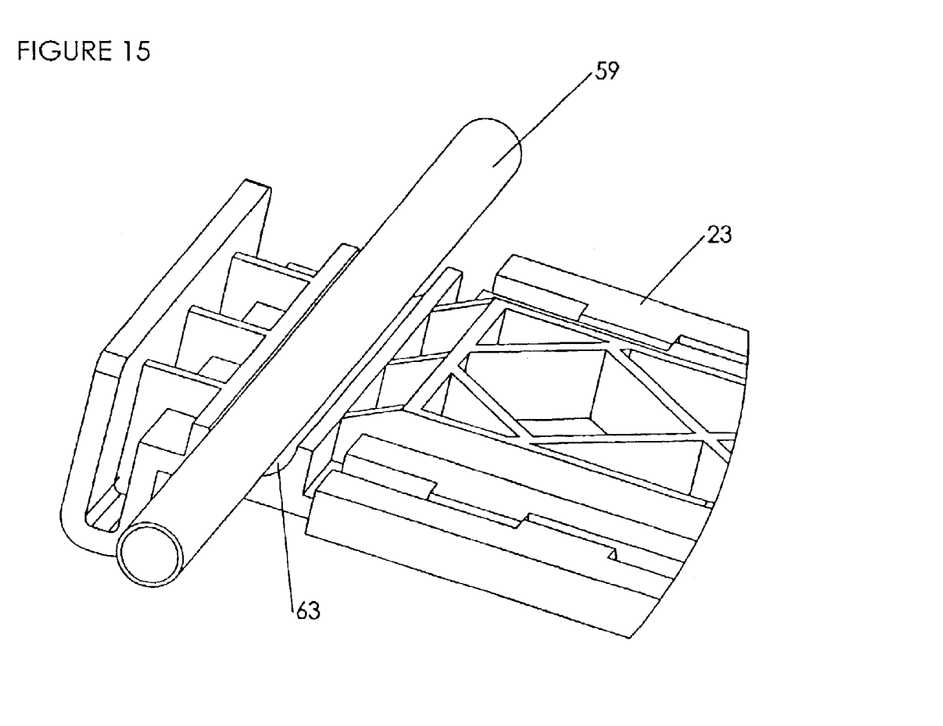
FIG. 15 is a bottom perspective view, partially broken away, depicting a portion of the wagon/cart of the present invention.
Figure 16:
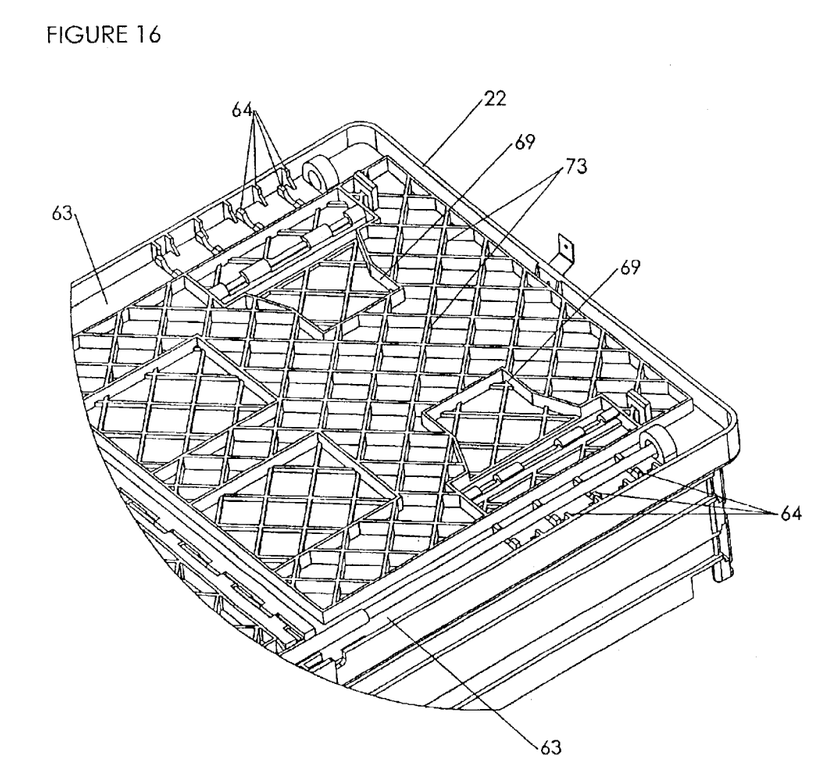
FIG. 16 is a bottom perspective view, partially broken away, of the rear of the wagon/cart of the present invention with the wheel assemblies removed therefrom.
Figure 17:
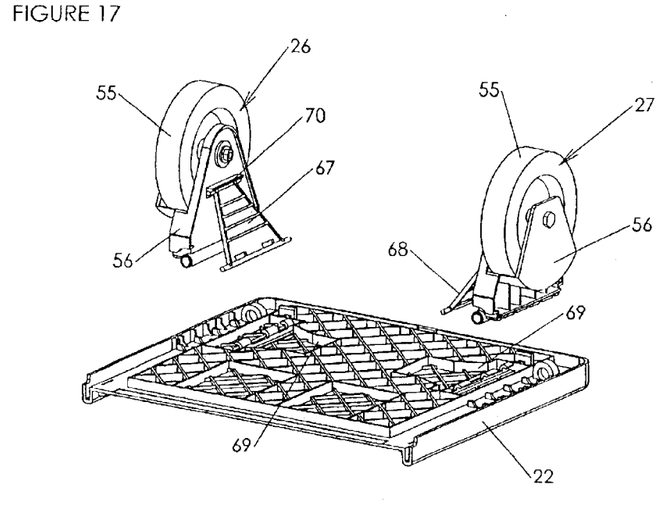
FIG. 17 is an exploded bottom perspective view of the rear components employed in the wagon/cart of the present invention.
Figure 18:
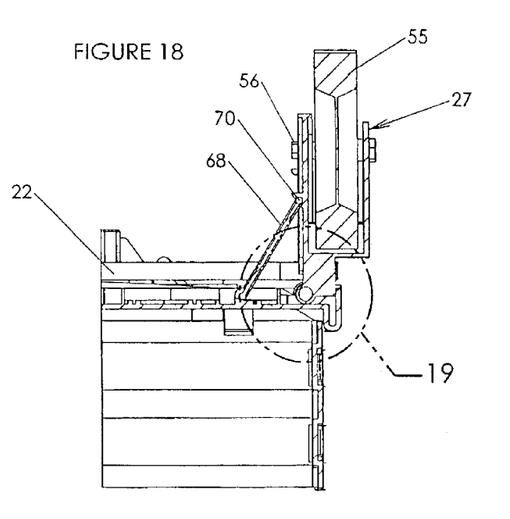
FIG. 18 is a rear end elevation view of the fully assembled wagon/cart of the present invention.
Figure 19:
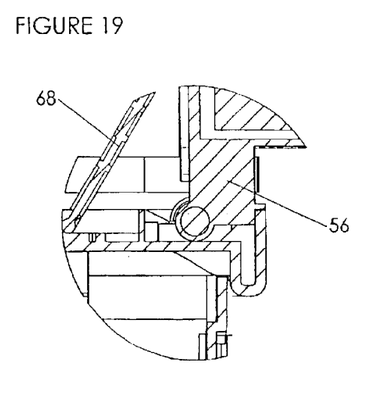
FIG. 19 is a greatly enlarged, cross-sectional view of portion 19 of FIG. 18.

One of the principal features of the present invention is the construction, operation, and manner of deployment employed for rear wheel assemblies 26 and 27. As best seen in FIG. 14, each rear wheel assembly 26 and 27 comprises wheel member 55 and support plate 56. In addition, each support plate 56 is securely affixed to a cylindrically shaped housing 57 formed at the base thereof, with cylindrically shaped housing 57 being securely affixed to telescoping tube segment 58. In addition, tube segment 58 is interconnected and cooperates with intermediate, telescoping tube segments 59, while tube segments 59 are telescopically secured to and engagable within cylindrical housing 60.

In the preferred construction, tube segments 58 and 59 are telescopically engaged with each other and secured within housing 60 whenever wheel assemblies 26 and 27 are in their collapsed, folded configuration, as depicted in FIGS. 9 and 10. In this position, cylindrical housing 57 is mounted in abutting, adjacent relationship with housing 60. In addition, whenever wagon/cart 20 is to be unfolded for use, wheel assemblies 26 and 27 are longitudinally extended from their collapsed position, directly adjacent wheel assemblies 24 and 25, to their operational position at the rear of support plate 22.

Whenever wheel assemblies 26 and 27 are longitudinally moved into engagement with support panel 22, telescoping tube segments 58 and 59 are automatically deployed, axially extending outwardly from housing 60, forming an elongated, continuous, support rod which extends from wheel assemblies 24 and 25 to wheel assemblies 26 and 27.

By employing this construction, an elongated, weight supporting rod structure is attained which is automatically formed directly below support panels 21, 22, and 23. This rod structure establishes an integral, weight bearing beam on each side of wagon/cart 20, with wheel assembly 24 securely affixed to and lockingly engaged with wheel assembly 26 on one side of wagon/cart 20, while wheel assembly 25 is securely affixed to and lockingly engaged with wheel assembly 27 on the opposed side.

As is evident from the foregoing detailed discussion, by providing an elongated rod supporting member interconnecting wheel assemblies on each side of wagon/cart 20, support panels 21, 22, and 23 are capable of easily holding and transporting virtually any desired object, regardless of its weight. As added weight is applied to support panels 21, 22 and 23, the lower surfaces of each panel engage tube segments 58 and 59 which are securely engaged with cylindrical housing 57 and 60. As a result, an elongated, generally continuous rod member is established which is capable of providing the inherent structure required for supporting heavy objects, previously incapable of being transported by prior art products.

In addition, in order to further enhance and improve the weight supporting capabilities of the present invention, support panels 21, 22 and 23 each incorporate receiving channel 63 formed therein for securely retaining and cooperating with telescopic tube segments 58 and 59. In the preferred construction, receiving channels 63 comprise concave engaging surfaces which cooperate with the outer peripheral surface of tube segments 58 and 59, providing a smooth, contoured, engaging surface which peripherally surrounds and conforms to the shape of tube segments 58 and 59. In this way, enhanced supporting engagement is achieved between tube segments 58 and 59 and receiving channel 63, imparting wagon/cart 20 with improved integral strength and enhanced structural support.

By referring to FIGS. 16–19, along with the following detailed discussion, secure final deployment and mounted engagement of wheel assemblies 26 and 27 with support panel 22 can best be understood. In the preferred construction, support panel 22 incorporates a plurality of flange elements 64 mounted in receiving channel 63 adjacent to terminating end of support panel 22. As depicted, flange elements 64 are formed in the precise position where support plate 56 of wheel assemblies 26 and 27 are to be positioned.

In addition, support plate 56 of each wheel assembly 26 and 27 also incorporate cooperating flange elements 65 which are constructed for cooperating interengagement with flange elements 64. As result, whenever support plate 64 is extended to its final position in association with support panel 22, support plate 26 is arcuately pivoted to be substantially perpendicular to support panel 22. This arcuate movement enables flange elements 65 to cooperatingly engage with flange elements 64. As a result of this construction, each support plate 56 of wheel assemblies 26 and 27 are in locked interengagement with support panel 22, preventing any possibility that wheel assemblies 26 or 27 can be longitudinally moved relative to support panel 22 during use.

In addition, wheel assemblies 26 and 27 are securely mounted in their fully erect, deployed position in a manner similar to the manner in which wheel assemblies 24 and 25 are mounted. In this regard, wheel assembly 26 cooperates with a locking plate 67 which is pivotally mounted to support panel 22. Similarly, wheel assembly 27 is mounted in its desired, substantially perpendicular position relative to support panel 22 by employing locking plate 68.

In the preferred construction, locking plates 67 and 68 are pivotally mounted to support panel 22, movable from a stowed position within holding zone 69 to an erect position, with the terminating end thereof securely mounted in abutting, locked engagement with locking rib 70 of support plate 56. Once locking plates 67 and 68 are mounted in engagement with locking rib 70 of support plates 56, wheel assemblies 26 and 27 are fully deployed, securely affixed and the precisely desired position for enabling wheel assemblies 26 and 27 to cooperate with wheel assemblies 24 and 25, providing the desired transport of any object or item, with ease and convenience.

As shown throughout the drawings, support panels 21, 22, and 23 each comprise a substantially flat, planer surface 72 formed on one side thereof, which is employed as the top surface when wagon/cart 20 is in its fully erect, unfolded configuration. By providing flat surface 72, users are able to easily place any desired object on surface 72 for secure positioning and movement.

In addition, in the preferred embodiment, the opposed surface of support panels 21, 22, and 23 comprises a plurality of separate and independent wall members 73 which are formed in juxtaposed, spaced relationship to each other, forming a generally intersecting, interlocking, interwoven array. In this way, weight reduction is achieved while also optimizing the structural strength and rigidity of support panels 21, 22, and 23.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall there between, Having described our invention, what we claim as new and desire to secure by Letters Patent is:

1. A wagon or cart constructed for being easily deployed from a fully folded, stowed configuration into a fully erected and usable position, said wagon or cart comprising:
   A. at least two support panels comprising a first support panel and a second support panel
      a. pivotally secured to each other, and
      b. movable between a first folded position, wherein at least a portion of the first support panel is in spaced, overlying relationship to the second support panel, and a second unfolded position, wherein said first and second support panels are aligned in a substantially continuous, single plane;
   B. four separate and independent wheel assemblies, each being mounted to the first support panel and movable between a first stowed position, wherein each wheel assembly is positioned in overlying engagement with the first support panel and in juxtaposed, side to side relationship to each adjacent wheel assembly, and a second erect position, wherein each wheel assembly is arcuately pivoted into a position substantially perpendicular to the first support panel;
   C. two of said wheel assemblies being fixedly mounted to said first support panel and two of said wheel assemblies being independently movable from the first stowed position to a second deployed position wherein said movable wheel assemblies are longitudinally spaced away from the fixedly mounted wheel assemblies; and D. a telescoping rod assembly associated with each movable wheel assembly and constructed for being automatically deployed during the movement of the movable wheel assembly from its stowed position to a longitudinally extending deployed position.

whereby a wagon or cart is attained which is capable of being quickly and easily converted from a fully folded, stowed configuration to a fully deployed, usable configuration with all components positioned in precisely desired locations.

2. The wagon or cart defined in claim 1, wherein said telescoping rod assembly comprises a plurality of separate and independent interlocking tubular members which automatically extend longitudinally when said movable wheel assembly is moved from its stowed position to its deployed position, with said elongated, longitudinally extending, tubular members forming an elongated support rail positioned in cooperating relationship with the support panels when in their aligned, planar, second position.

3. The wagon or cart defined in claim 1, wherein said fixedly mounted wheel assemblies form the front wheels of the wagon or cart and the movable wheel assemblies form the rear wheels thereof, when in their longitudinally extended, deployed position.

4. The wagon or cart defined in claim 3, wherein the front wheels are mounted to a movable support member for enabling the front wheels to articulate relative to the support panel for providing ease of movement and maneuverability of the wagon or cart.

5. The wagon or cart defined in claim 4, and further comprising a handle member longitudinally extending from the support member for providing controlled movement of the support member and the wheels affixed therewith.

6. A wagon or cart constructed for being easily deployed from a fully folded, stowed configuration into a fully erected and usable position, said wagon or cart comprising:

A. a first front support panel, a second rear support panel, and a third intermediate support panel, said first front support panel and second rear support panel being pivotally mounted to the third intermediate support panel along the opposed edges thereof;

B. the first, second, and third support panels being movable between a first position wherein said first support panel is in spaced, generally parallel, overlying relationship with the second support panel, and a second position wherein the first support panel, the second support panel, and the third support panel are all aligned in a substantially continuous, single plane;

C. a substantially flat pivot plate mounted to the first support panel in spaced, aligned, generally parallel relationship therewith, and cooperatively associated with the first support panel for being angularly movable in its entirety relative to the first support panel;

D. a first wheel assembly and a second wheel assembly mounted to the pivot plate, and movable between a first stowed position wherein said wheel assemblies are positioned in overlying relationship with the pivot panel and in cooperating, generally side to side relationship with each other, and a second erect position wherein each wheel assembly is arcuately pivoted into a position substantially perpendicular to the pivot plate;

E. a third wheel assembly and a fourth wheel assembly both of which are independently movable between
  a. a first stowed position wherein said wheel assemblies are positioned in overlying relationship with the first support panel and in cooperating, generally side to side relationship with each other and with the first and second wheel assemblies, and
  b. a second deployed position wherein said wheel assemblies are longitudinally extended into cooperating relationship with the second support panel and are arcuately pivoted for being substantially perpendicular to said second support panel; and F. a control arm movably mounted to the pivot plate for providing easily controlled angular movement of the pivot plate relative to the first support plate;

whereby a wagon or cart is attained which is capable of being folded into a small, compact, stowed configuration and easily deployed into a fully erect, fully assembled, usable configuration with all components thereof positioned in precisely the desired locations.

7. The wagon or cart defined in claim 6, and further comprising two separate and independent telescoping rod assemblies cooperatively associated with the third and fourth wheel assemblies and constructed for being automatically deployed during the movement of the wheel assemblies from their stowed position into their longitudinally extended, deployed position.

8. The wagon or cart defined in claim 7, wherein each of said telescoping rod assemblies is further defined as comprising a plurality of separate and independent interlocking tubular members which automatically extend longitudinally when in the movable wheel assembly associated therewith is moved from its stowed position to its deployed position, with the elongated, longitudinally extending, tubular members forming an elongated support rail positioned in longitudinally extending, cooperating relationship with the first front support panel, the second rear support panel, and the third intermediate support panel when said panels are in their aligned, planar, second position.

9. The wagon or cart defined in claim 8, wherein said first support panel, said second support panel, and said third support panel are each further defined as comprising an elongated, longitudinally extending receiving channel formed along the side edges thereof and constructed for receiving and securely retaining the interlocking tubular members forming the telescoping rod assembly.

10. The wagon or cart defined in claim 9, wherein said receiving channels are further defined as comprising concave engaging surfaces dimensioned for cooperating with the outer peripheral surfaces of the tubular members and providing a smooth, contoured, engaging surface for peripherally surrounding and conforming to the shape of the tubular members, thereby imparting enhanced strength and rigidity thereto, effectively achieving an elongated, structurally enhanced weight-bearing support assembly therefore.

11. The wagon or cart defined in claim 6, wherein each of said first and second wheel assemblies is further defined as comprising a wheel member rotationally mounted to and supportingly maintained by a support plate, with said support plate being pivotally mounted to said pivot plate for enabling the wheel assembly to be moved from its stowed position to its erect position.

12. The wagon or cart defined in claim 11, wherein said support plate is further defined as comprising a rib element formed thereon and the pivot plate is further defined as comprising a movable locking plate pivotally mounted thereto in cooperating relationship with the support plate of the wheel assembly for being moved from a stowed position with the pivot plate to a raised position cooperating with and lockingly engaging the rib element of the support plate, thereby providing an easily erected lock member for maintaining the wheel assembly in its raise position.

13. The wagon or cart defined in claim 12, wherein the second support panel further comprises a plurality of locking ribs and each of said third and fourth wheel assemblies is further defined as comprising a wheel member rotationally mounted to and supportingly maintained by a support plate, with said support plate incorporating a plurality of locking ribs formed therein which are constructed for cooperating interengagement between the plurality of locking ribs formed in the second support panel when said wheel assembly is arcuately pivoted into its erect position, thereby preventing axial movement of the wheel assembly when in its erect position.

14. The wagon or cart defined in claim 6, wherein said wagon or cart further comprises wall panels cooperatively associated with and peripherally surrounding the outer peripheral edge of the first support panel, the second support panel, and the third support panel, when said panels are in their second, substantially planar position, thereby providing sidewalls enclosing the wagon or cart when in a fully deployed configuration.

15. The wagon or cart defined in claim 14, wherein said wall panels are further defined as comprising a front wall segment pivotally mounted to the leading edge of the first support panel and foldable side panel segments mounted along opposed edges of said front wall segment for being movable from an upstanding, fully deployed configuration cooperating with the front wall segment for establishing a wall member therewith in a stowed position, wherein said foldable panel segments are pivotally collapsed into aligned, overlying cooperating relationship with each other.

16. The wagon or cart defined in claim 15, wherein said wall panels further comprise a rear wall segment pivotally mounted to the trailing edge of the second support panel and foldable side panel segments mounted along the opposed edges of said a rear wall segment for being movable from an upstanding, fully deployed configuration, cooperating with the rear wall segment for establishing a wall member therewith in a stowed position, wherein said foldable panel segments are pivotally collapsed into aligned, overlying cooperating relationship with each other.

* * * * *